Nov. 5, 1957    J. V. MICKMAN    2,812,398
ACCELERATION RESPONSIVE DEVICE
Filed Aug. 15, 1955

INVENTOR.
JOHN V. MICKMAN
BY Frederick E. Lange
ATTORNEY

United States Patent Office 2,812,398
Patented Nov. 5, 1957

2,812,398
ACCELERATION RESPONSIVE DEVICE

John V. Mickman, Minneapolis, Minn., assignor to Minneapolis-Honeywell Regulator Company, Minneapolis, Minn., a corporation of Delaware Application August 15, 1955, Serial No. 528,161

9 Claims. (Cl. 200—61.45)

This invention relates to acceleration responsive devices and more particularly to an acceleration responsive switch. One embodiment of my invention has particular utility as a pitch "G" limiter on an airplane wherein the pitch "G" limiter prevents the automatic control system of the airplane from putting the airplane into a maneuver wherein the "G" loading would be greater than the airplane could safely withstand.

The "G" loading on an airplane is due to the acceleration of the airplane. There may be a linear acceleration as well as an angular acceleration. Accelerometers in the past have been designed to sense one type of acceleration, either linear or angular. Normally in aircraft it is the linear acceleration normal to the pitch axis of the airplane that cause "G" loadings on the airplane that damage it, such as causing excessive stresses in the wings.

For small angular acceleration the buildup of "G" loading normal to the pitch axis will be slow and may safely reach a rather high linear acceleration. For fast angular accelerations the buildup of "G" loadings normal to the pitch axis will be fast and the safe limits may be overshot. Therefore it is desirable to sense both the normal linear acceleration and the angular acceleration with the angular acceleration anticipating high normal "G" loadings. By sensing angular accleration as well as linear acceleration dangerous linear acceleration conditions may be anticipated.

My invention senses linear and angular accelerations by having a mass pivotally supported near but spaced from its center of gravity and spring biased to a normal angular position. Since it is pivoted and capable of angular movement it is sensitive to angular accelerations about the pivotal axis. Due to its being pivoted on an axis spaced from its center of gravity it is sensitive to linear accelerations in directions other than along a plane through its pivotal axis and its center of gravity. It will sense the component of acceleration normal to the plane through its center of gravity and pivotal axis due to the unbalance in that plane about its pivotal axis.

Therefore an object of my invention is to provide an acceleration responsive device.

Another object of my invention is to provide an acceleration responsive switch.

Yet another object of my invention is to provide one device that will be sensitive to both linear and angular acceleration.

Further objects of my invention will become evident upon inspection of the following drawings, specification and claims.

Figure 1:
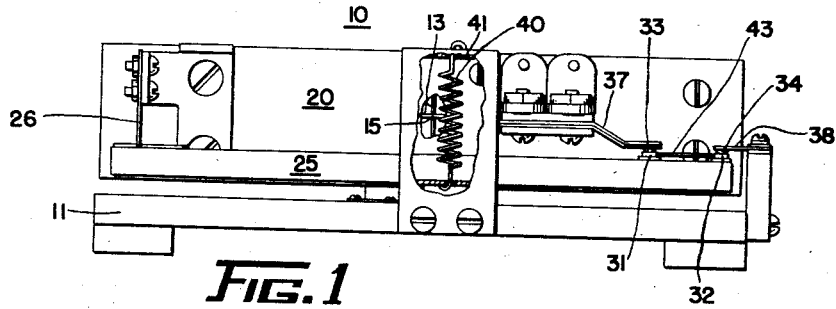
Figure 1 is an elevation partly in section of a first embodiment of my invention.
Figure 2:
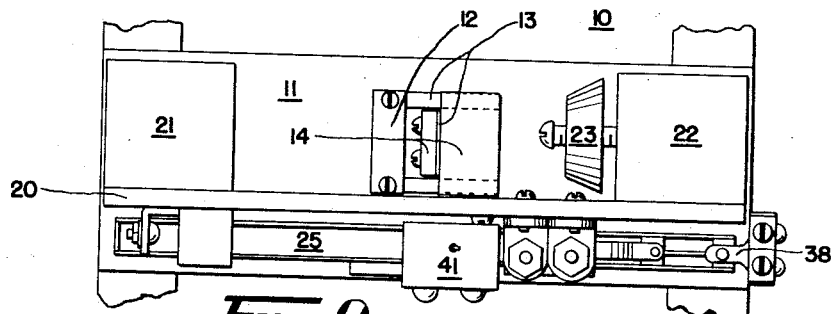
Figure 2 is a plan view of the embodiment of Figure 1 of my invention.

Referring to Figures 1 and 2 the device of an embodiment of my invention is indicated by the numeral 10. A support 11 carries bracket members 12 which position reed members 13 are also attached to bracket members 14 on lever 20. Lever 20 is thereby pivotally attached to support 11 by cross reed pivots 13 with the pivotal axis 15 of lever 20 established at the crossing of reeds 13. A pair of weights, 21 and 22 are mounted one each on an end of lever 20. Weight 22 has an additional weight 23 attached to it causing an adjustable unbalance of lever 20 about its pivotal axis 15 as formed by cross reed pivots 13.

A contact carrying member 25 is pivoted to lever 20 by resilient member 26. Contacts 31 and 32 carried by member 25 cooperate with contacts 33 and 34 respectively. Contact 33 is attached to lever 20 through resilient member 37, and contact 34 is attached to support 11 through resilient member 38. Contact carrying member 25 is biased to a normal position by a tension spring 40 one end of which is attached to member 25 and the other to a bracket 41 attached to support 11. In said normal position contact carrying member 25 positions contacts 31 and 32 such that contact 31 engages contact 33 and contact 32 engages contact 34.

The center of gravity of lever 20 and weights 21, 22 and 23 and the pivotal axis 15 lie in a plane parallel to the support 11. Linear acceleration is sensed normal to said plane with lever 20 rotating about its pivotal axis 15 due to the unbalance or spacing of the center of gravity from the pivotal axis 15. Assuming an acceleration positive in the upward direction of sufficient magnitude to overcome the spring bias of spring 40 weights 22 and 23 will resist acceleration more than weight 21 and the lever 20 will rotate clockwise separating contacts 32 and 34, conversely assuming an acceleration positive in the downward direction sufficient to overcome the spring bias of spring 40 the lever will rotate counter-clockwise separating contacts 31 and 33.

For purely angular acceleration, the effect of the weights is to resist acceleration together in either direction. Thus an angular acceleration of support 11 clockwise will cause lever 20 to tend to rotate about pivotal axis 15 counter-clockwise as seen in Figure 1 separating contacts 31 and 33 and an angular acceleration of support 11 counter-clockwise will cause lever 20 to tend to rotate clockwise separating contacts 32 and 34.

Contacts 31 and 32 are electrically connected by strip 43. With the device subjected to no accelerations and the lever 20 is in its normal position a circuit is established from contact 33 to 34 through contacts 31 and 32 and electrical conductor 43. This circuit can be used as a switch for disengagement of a control means such as an autopilot. Upon either a linear acceleration or an angular acceleration or a combination of the two sufficient to overcome the spring bias of spring 40 a pair of the contacts will separate, disengaging the control means. The values of acceleration at which this will occur will be dependent upon the moment arm lengths about pivotal axis 15 and the size of the spring force applied through spring 40. These can be varied to satisfy specific limitations of acceleration as desired.

Figure 3:
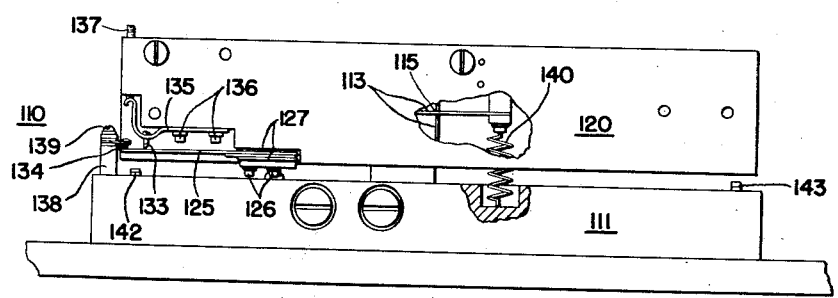
Figure 3 is an elevation of a second embodiment of my invention.
Figure 4:
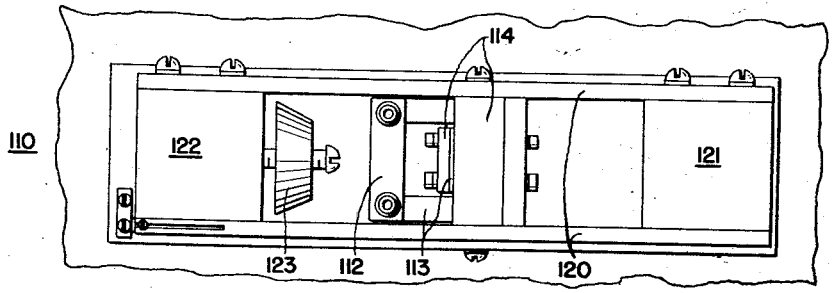
Figure 4 is a plan view of the embodiment of Figure 3 of my invention.

Referring now to Figures 3 and 4 another embodiment of my invention is illustrated as indicated by the numeral 110. A support 111 carries bracket members 112 which position reed members 113. Reed members 113 are also attached to bracket members 114 on lever 120. Lever 120 is thereby pivotally attached to support 111 by cross reed pivots 113 with the pivotal axis 115 of lever 120 established at the crossing of reeds 113. A pair of weights 121 and 122 are mounted one each at an end of lever 120. Weight 122 has an additional weight 123 attached to it causing an unbalance of lever 120 about its pivotal axis 115 as formed by cross reed pivots 113.

A resilient electrical conducting member 125 is attached to lever 120 by screws 126 and electrically insulated from lever 120 by dielectric members 127. A contact 133 is carried by lever 120 and a contact 134 is carried by support 111. Contact 133 is attached to lever 120 by resilient member 135 and screws 136 and the position of contact 133 relative to lever 120 can be adjusted by screw 137. Contact 134 is attached to support 111 by port 138 and screws 139. Contacts 133 and 134 cooperate with member 125. Tension spring 140 one end of which is attached to lever 120 and the other to support 111 biases lever 120 into a normal position in which member 125 cooperates with both contacts 133 and 134 establishing an electrical circuit between contacts 133 and 134.

The center of gravity of lever 120 and weights 121, 122 and 123 and the pivotal axis 115 lie in a plane parallel to the length of support 111. Linear acceleration is sensed normal to said plane with lever 120 rotating about its pivotal axis 115 due to the unbalance or spacing of the center of gravity of lever 120 and weights 121, 122 and 123 from the pivotal axis 115. Assuming a vertical upward acceleration of the support 111 of sufficient magnitude to overcome the spring bias of spring 140 weights 122 and 123 will resist acceleration more than weight 121 and the lever 120 will rotate counter-clockwise separating contact 134 from member 125, conversely assuming a vertical downward acceleration of sufficient magnitude to overcome the spring bias of spring 140 the lever will rotate clockwise separating contact 133 from member 125. Also an angular acceleration clockwise about pivotal axis 115 will cause lever 120 to tend to rotate counter-clockwise separating contact 134 from member 125 and an angular acceleration counter-clockwise about pivotal axis 115 will cause lever 120 to tend to rotate clockwise separating contact 133 from member 125. Here again the separating of either contact 133 or 134 from member 125 can be used as a switch in a control circuit with the values of acceleration at which switching occurs dependent upon the moment arm lengths about pivotal axis 115 and the size of the spring bias applied through spring 140. Adjustable stops 142, and 143 are provided to limit the amount of rotation of lever 120.

The embodiment of my invention as described have particular utility for use as a pitch "G" limiters in connection with the automatic control system on modern jet aircraft. The automatic control systems have the power available to put the aircraft into maneuvers the aircraft cannot structurally withstand. The combination in a device of the ability to sense both linear accelerations normal to the pitch axis and angular accelerations or the sum of both is particularly desirable for this use in that the sum of the two is subjected to the aircraft.

While I have shown and described two specific embodiments of my invention I do not intend to limit my invention to these embodiments but only to limit my invention as described in the appended claims.

I claim as my invention:

1. In an acceleration responsive switch, a support, a lever carried in said support and adapted to oscillate about a pivotal axis, a pair of weights mounted one on each end of said lever, said lever being in unbalance about said pivotal axis, a resilient member pivoted to said lever, first and second contacts carried by said resilient member, a third contact carried by said lever in cooperation with said first contact carried by said resilient member, said resilient member normally biasing said first contact into engagement with said third contact on said lever, a fourth contact carried by said support positioned for cooperation with said second contact on said resilient member, and a spring means biasing said lever to a normal position with said first contact in engagement with said third contact and said second contact in engagement with said fourth contact, the center of gravity of said weights and said lever and the pivotal axis of said lever lying in a plane, an angular acceleration of said support or an acceleration of said support normal to said plane rotating said lever against said spring bias to separate either said first and third contacts or said second and fourth contacts.

2. In an acceleration responsive switch a support, a lever carried in said support and attached to oscillate about a pivotal axis, a pair of weights mounted one on each end of said lever, the center of gravity of said lever and said weights being near but spaced from said pivotal axis, a member pivoted to said lever, a first and second contact carried by said member, a third contact carried by said lever in cooperation with said first contact, a fourth contact carried by said support in cooperation with said second contact, and a spring means biasing said lever to a normal position with said member causing engagement of said first and third and said second and fourth contacts, the center of gravity of said weights and said lever and the pivotal axis of said lever substantially lying in a plane, said lever rotating upon a linear acceleration of said support normal to said plane and upon an angular acceleration of said support, a rotation of said lever separating said first and third or said second and fourth contacts.

3. In an acceleration responsive device a support, a lever carried in said support and adapted to oscillate about a pivotal axis, the center of gravity of said lever being near but spaced from said pivotal axis, and cooperating means on said lever and said support biasing said lever to a normal fixed angular position with respect to said support, said cooperating means including a spring means, a pivoted member and a pair of stops, said pivoted member being in engagement with both of said stops when said lever is in said normal position, the center of gravity of said lever and said pivotal axis of said lever lying in a plane, said lever rotating upon a linear acceleration of said support normal to said plane and upon an angular acceleration of said support, a rotation of said lever separating one of said stops from engagement with said member indicative of a predetermined acceleration.

4. In an acceleration responsive device a support, a lever pivotally mounted near but spaced from its center of gravity in said support, two weights mounted each one on an opposite end of said lever, a member pivoted to said lever, a pair of stops cooperating with said member, and a spring means biasing said lever to a normal position with said member in engagement with both of said stops, the centers of gravity of said weights, the center of gravity of said lever, and the pivotal axis of said lever lying in a plane, said lever rotating upon a linear acceleration of said support normal to said plane and upon an angular acceleration of said support, rotation of said lever separating one of said stops from engagement with said member indicative of a predetermined acceleration.

5. In an acceleration responsive device a support, a lever pivotally mounted in said support, a member pivoted to said lever, a pair of stops cooperating with said member, said lever being in an unbalanced condition about a pivotal axis, the center of gravity of said lever being near but spaced from said pivotal axis, and a spring means biasing said lever to a normal position with said member in engagement with both of said stops, the center of gravity of said lever and the pivotal axis of said lever lying in a plane, said lever rotating upon a linear acceleration of said support normal to said plane and upon an angular acceleration of said support, rotation of said lever against the bias of said spring means separating said member from engagement with one of said stops, indicative of a predetermined acceleration.

6. In an acceleration responsive device a support, a lever carried in said support and adapted to oscillate about a pivotal axis, a member pivoted to said lever, a pair of stops cooperating with said member, said lever being in an unbalanced condition about said pivotal axis, and a spring means biasing said lever to a normal position with said member in engagement with both of said stops, the center of gravity of said lever and the pivotal axis of said lever lying in a plane, said lever rotating upon a linear acceleration of said support normal to said plane and upon an angular acceleration of said support, a rotation of said lever separating said member from engagement with one of said stops indicative of a predetermined acceleration.

7. In an acceleration responsive device a support, a lever carried in said support and adapted to oscillate about a pivotal axis, a pair of weights mounted one each on an end of said lever, said lever being in unbalance about said pivotal axis, a member pivoted to said lever, a pair of stops cooperating with said member, and a spring means biasing said lever to a normal position with said member in engagement with both of said stops, the center of gravity of said weights and said lever and the pivotal axis of said lever substantially lying in a plane, rotation of said lever against said spring bias separating said member from engagement with one of said stops indicative of a predetermined acceleration of said support either normal to said plane or angular.

8. In an acceleration responsive device a support, a first member of substantial mass carried on said support and adapted to oscillate about a pivotal axis, said first member being in unbalance about said pivotal axis, a second member pivoted to said first member, a pair of stops cooperating with said second member, and a spring means biasing said first member to a normal position with said second member in engagement with both of said stops, the center of gravity of said first member and the pivotal axis of said first member substantially lying in a plane, said lever rotating upon an acceleration of said support normal to said plane and upon an angular acceleration of said support, rotation of said first member separating said second member from engagement with one of said stops indicative of a predetermined acceleration.

9. In an acceleration responsive switch a support, a first member carried in said support and adapted to oscillate about a pivotal axis, a second member pivoted in said support, a pair of stops, one of said stops carried by said first member and the other of said stops carried by said support, and a spring means normally biasing said second member into engagement with both of said stops and biasing said first member to a normal position, the center of gravity of said first member being near but spaced from said pivotal axis, said center of gravity of said first member and said pivotal axis lying in a plane, sufficient angular acceleration of said support or acceleration of said support normal to said plane rotating said first member against said spring bias separating said second member from engagement with one of said stops, a switching means operated by rotation of said first member.

References Cited in the file of this patent
UNITED STATES PATENTS
2,698,886   Statham et al. _____ Jan. 4, 1955